United States Patent
Fohtung

(10) Patent No.: US 12,523,784 B2
(45) Date of Patent: Jan. 13, 2026

(54) PROGRAMMABLE AND TUNABLE CYLINDRICAL DEFLECTOR ANALYZERS

(71) Applicant: Rensselaer Polytechnic Institute, Troy, NY (US)

(72) Inventor: Edwin Fohtung, Niskayuna, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 99 days.

(21) Appl. No.: 18/275,256

(22) PCT Filed: Feb. 1, 2022

(86) PCT No.: PCT/US2022/014661
§ 371 (c)(1),
(2) Date: Aug. 1, 2023

(87) PCT Pub. No.: WO2022/165397
PCT Pub. Date: Aug. 4, 2022

(65) Prior Publication Data
US 2024/0159919 A1    May 16, 2024

Related U.S. Application Data

(60) Provisional application No. 63/144,127, filed on Feb. 1, 2021.

(51) Int. Cl.
*G01T 1/16*    (2006.01)
(52) U.S. Cl.
CPC .................................. *G01T 1/1606* (2013.01)
(58) Field of Classification Search
CPC .. G01T 1/1606; H01J 2237/053; H01J 49/482
See application file for complete search history.

(56) References Cited

U.S. PATENT DOCUMENTS 3,239,662 A * 3/1966 Hans ..................... H01J 49/328
250/296
3,920,990 A * 11/1975 Van Nieuwland .... H01J 49/482
250/294

(Continued)

FOREIGN PATENT DOCUMENTS

CN    104202894 A    12/2014
CN    106990085 A    7/2017

(Continued)

OTHER PUBLICATIONS

International Search Report and The Written Opinion of the International Searching Authority, International Application No. PCT/US2022/014661, mailed May 4, 2022.

*Primary Examiner* — David P Porta
*Assistant Examiner* — Gisselle M Gutierrez
(74) *Attorney, Agent, or Firm* — Barclay Damon LLP; Anthony P. Gangemi

(57) ABSTRACT

An electrostatic analyzer includes a cylindrical body having an inner cylinder and an outer cylinder that are coaxial with one another along a longitudinal axis of the cylindrical body. An inner cylindrical electrode is positioned on an exterior face of the inner cylinder. An outer cylindrical electrode is positioned on an interior face of the outer cylinder. A first azimuthal electrode positioned on a face of a first azimuthal plane that passes through the longitudinal axis. A second azimuthal electrode is positioned on a face of a second azimuthal plane that passes through the longitudinal axis. A first end electrode is positioned on a first end face of the cylindrical body. A second end electrode is positioned on a second end face of the cylindrical body.

18 Claims, 6 Drawing Sheets

(56) References Cited

U.S. PATENT DOCUMENTS

| | | | | |
|---|---|---|---|---|
| 4,367,406 A | * | 1/1983 | Franzen | H01J 49/48 250/305 |
| 4,723,076 A | | 2/1988 | Bateman | |
| 5,068,525 A | | 11/1991 | Schaefer et al. | |
| 5,194,732 A | | 3/1993 | Bateman | |
| 5,374,828 A | | 12/1994 | Boumsellek et al. | |
| 5,886,346 A | | 3/1999 | Makarov | |
| 6,762,408 B1 | | 7/2004 | Read | |
| 6,970,790 B2 | | 11/2005 | Kita et al. | |
| 10,354,855 B2 | | 7/2019 | Verenchikov | |
| 2011/0251801 A1 | * | 10/2011 | Misharin | H01J 49/0036 702/32 |
| 2012/0043461 A1 | | 2/2012 | Nikolaev et al. | |
| 2013/0105687 A1 | | 5/2013 | Cubric | |
| 2013/0248702 A1 | | 9/2013 | Makarov | |
| 2014/0217275 A1 | * | 8/2014 | Ding | H01J 49/4245 250/282 |
| 2014/0291503 A1 | | 10/2014 | Shchepunov et al. | |
| 2015/0136970 A1 | * | 5/2015 | Hoyes | H01J 49/401 250/282 |
| 2016/0093483 A1 | * | 3/2016 | Hoyes | H01J 49/401 250/290 |
| 2016/0126083 A1 | | 5/2016 | Hoyes | |
| 2016/0211128 A1 | | 7/2016 | Williams, Jr. | |
| 2017/0032951 A1 | * | 2/2017 | Hoyes | H01J 49/401 |
| 2017/0278683 A1 | | 9/2017 | Hey | |
| 2018/0372666 A1 | | 12/2018 | Chou | |
| 2019/0086363 A1 | | 3/2019 | Covey et al. | |
| 2020/0015717 A1 | | 1/2020 | Taghioskoui | |
| 2020/0152437 A1 | | 5/2020 | Ryan | |
| 2021/0407784 A1 | | 12/2021 | Chen et al. | |

FOREIGN PATENT DOCUMENTS

| | | |
|---|---|---|
| CN | 113466921 A | 10/2021 |
| CN | 114646598 A | 6/2022 |
| WO | 2010057476 A2 | 5/2010 |

* cited by examiner

PROGRAMMABLE AND TUNABLE CYLINDRICAL DEFLECTOR ANALYZERS

CROSS REFERENCE TO RELATED APPLICATION(S)

This application is a U.S. National Stage Application of, and claims the priority benefit of, International Patent Application No. PCT/US2022/014661, filed Feb. 1, 2022, which claims the priority benefit of U.S. Provisional Patent Application No. 63/144,127, filed Feb. 1, 2021, the contents of which are incorporated by reference as if disclosed herein in their entireties.

FIELD

The present technology generally relates to the area of charged-particle energy analyzers, and more particularly, to a cylindrical deflector analyzer having six electrodes.

BACKGROUND

Electrostatic analyzers ("ESA") are used in charged particle optics to measure the energy per unit charge distribution of ion and electron beams, in the downstream regions of thrusters. The cylindrical deflector analyzer ("CDA") is used for the analysis of kinetic energy of electrons. A disadvantage of traditional CDAs is that the particle beam can only be focused in one plane of deflection. Thus, a need exists for an improved CDA.

SUMMARY

Accordingly, embodiments of the present technology are directed to an analytical-numerical approach to compute the electrostatic field distribution in a six-electrode cylindrical charged-particle deflector analyzer. In some embodiments, the field distribution is found to compute as Bessel functions with pure imaginary indices. In some embodiments, imposing the Dirichlet boundary condition on the coaxial cylindrical electrode system results in a closed and compact analytical solution of the electrostatic field distribution with electrode voltage, with the geometrical parameters as the only variable.

According to an embodiment of the present technology, an electrostatic analyzer is provided. The electrostatic analyzer includes a cylindrical body having an inner cylinder and an outer cylinder that are coaxial with one another along a longitudinal axis of the cylindrical body. An inner cylindrical electrode is positioned on an exterior face of the inner cylinder. An outer cylindrical electrode is positioned on an interior face of the outer cylinder. A first azimuthal electrode positioned on a face of a first azimuthal plane that passes through the longitudinal axis. A second azimuthal electrode is positioned on a face of a second azimuthal plane that passes through the longitudinal axis. A first end electrode is positioned on a first end face of the cylindrical body. A second end electrode is positioned on a second end face of the cylindrical body.

In some embodiments, the inner cylinder and the outer cylinder are spaced apart to form a gap therebetween. The gap has an entry slit positioned at a first end thereof and an exit slit positioned at a second end thereof.

In some embodiments, the electrostatic analyzer includes a detector positioned adjacent the exit slit configured to receive a particle beam that enters the gap via the entry slit and exits the gap via the exit slit.

In some embodiments, the entry slit and the exit slit are positioned such that a particle beam is configured to enter the gap at a radius of the electrical center of the electrostatic analyzer.

In some embodiments, the inner cylindrical electrode and the outer cylindrical electrode have equal and opposite voltages applied thereto and the electrical center of the electrostatic analyzer is located at $r_0 = \sqrt{r_1 r_2}$, where $r_1$ is the radius of the inner cylindrical electrode and $r_2$ is the radius of the outer cylindrical electrode.

According to another embodiment of the present technology, a method of determining the electrostatic field distribution in an electrostatic analyzer is provided. The method includes the steps of: providing an electrostatic analyzer; grouping the boundary conditions of each of the electrodes into six simplified problems; defining the electric potential in the electrostatic analyzer by applying the Dirichlet's problem to the six simplified problems; expressing the electric potential as a product of three potential functions in terms of Laplace's equation for cylindrical coordinates; transferring a function to another side of the equation and separating the variables; using the Bessel equation to build a system of equations; and determining a general solution to the system of equations. In some embodiments, the electrostatic analyzer includes a cylindrical body having an inner cylinder and an outer cylinder that are coaxial with one another along a longitudinal axis of the cylindrical body. An inner cylindrical electrode is positioned on an exterior face of the inner cylinder. An outer cylindrical electrode is positioned on an interior face of the outer cylinder. A first azimuthal electrode positioned on a face of a first azimuthal plane that passes through the longitudinal axis. A second azimuthal electrode is positioned on a face of a second azimuthal plane that passes through the longitudinal axis. A first end electrode is positioned on a first end face of the cylindrical body. A second end electrode is positioned on a second end face of the cylindrical body.

Further objects, aspects, features, and embodiments of the present technology will be apparent from the drawing figures and below description.

DETAILED DESCRIPTION

Figure 1A:
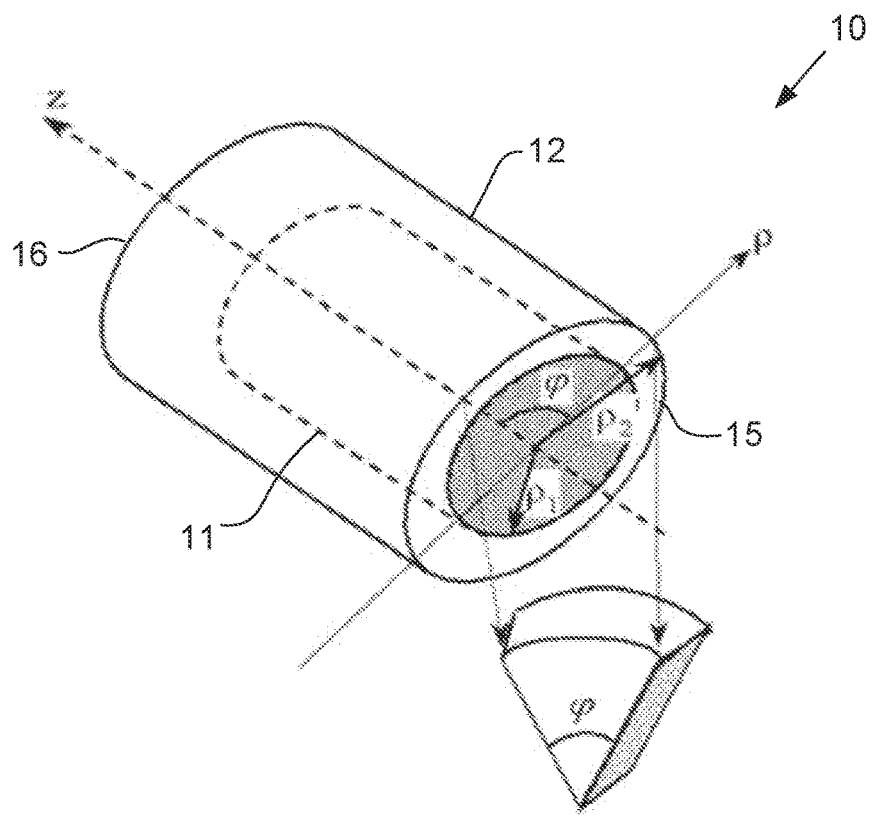
FIG. 1A is a schematic view of a cylindrical deflector analyzer ("CDA") according to an exemplary embodiment of the present technology.
Figure 1B:
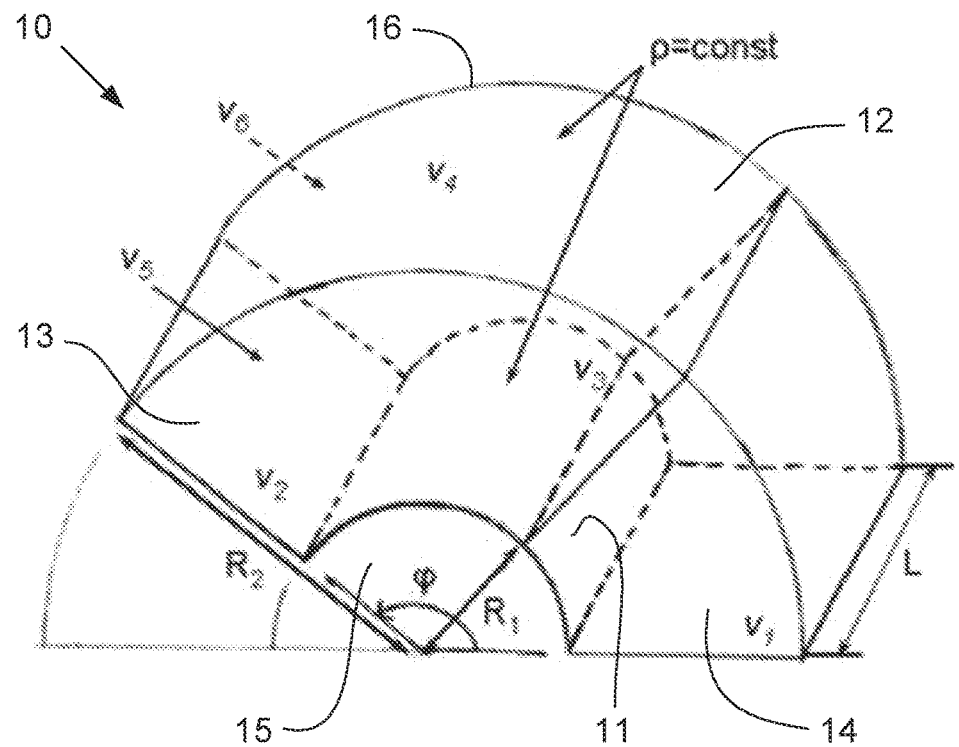
FIG. 1B is a schematic view showing the boundary potential of the CDA of FIG. 1A.

Accordingly, embodiments of the present technology are directed to a six-electrode cylindrical deflector analyzer ("CDA") and an analytical approach to compute the electrostatic field distribution in the CDA. FIGS. 1A-1B show the geometry of the CDA, also called the radial cylindrical analyzer. An electric field is produced by a potential difference placed across the cylindrical electrodes of the inner electrode radius and the outer electrode radius. Some embodiments of the present technology are directed to solving the electric field distribution created between the cylindrical surfaces.

FIGS. 1A-1B show the CDA 10 having a solid body S bounded by two coaxial cylinders of revolution (inner cylindrical electrode 11 and outer cylindrical electrode 12), two planes through the axis of these cylinders (first azimuthal electrode 13 and second azimuthal electrode 14), and two planes perpendicular to this axis (first end electrode 15 and second end electrode 16). The CDA 10 has a length L. Some embodiments are directed to finding a function U(x, y, z) which, everywhere within S satisfies Laplace's equation and is finite, continuous, and single valued, together with its first derivatives, and assumes on the surface of S arbitrarily assigned values.

Figure 2:
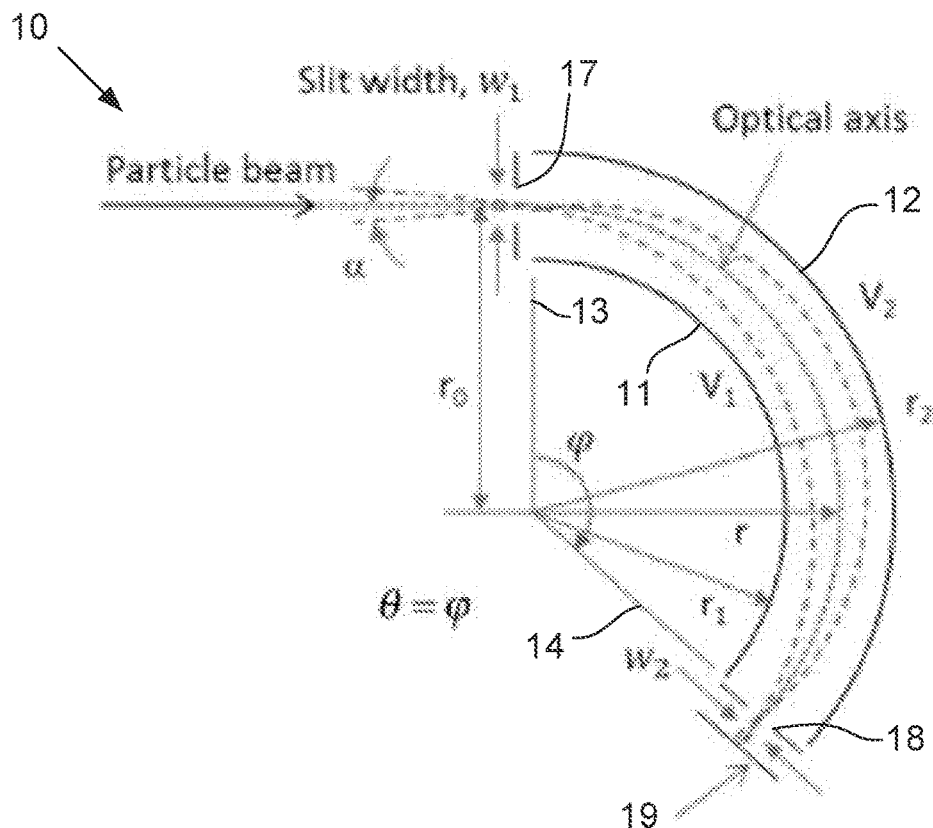
FIG. 2 is a cross sectional view of the CDA of FIG. 1A taken along section line 2-2.

The inner cylindrical electrode 11 and the outer cylindrical electrode 12 are concentric and spaced apart such that a gap is formed therebetween, as shown in FIG. 2. The inner cylindrical electrode 11 has a radius $r_1$, the outer cylindrical electrode 12 has a radius $r_2$, and the gap width is determined by the difference between $r_1$ and $r_2$. The CDA 10 has an entry slit 17 positioned on or adjacent the first azimuthal electrode 13, and an exit slit 18 positioned on or adjacent the second azimuthal electrode 14. The entry slit 17 has a width $w_1$ and the exit slit 18 has a width $w_2$. As shown in FIG. 2, a particle beam enters the CDA 10 through the entry slit 17, travels through the gap, and passes through the exit slit 18 to collide with a detector 19. The CDA 10 has an electrical center located at $r_0$.

In some embodiments, the cylindrical coordinate system of FIGS. 1A-1B is used to solve Laplace's equation in a region that is bounded by metallic electrodes. This coordinate system permits the possibility of multiple separations of variables. After this process, some embodiments use both numerical and analytical approaches to obtain the required potential. In some embodiments, the first step to solving the system is to group the boundary conditions into six simplified problems. The partial solutions of each of these problems sum up to give the required general solution. Each of these problems is preferably identical to the next with the exception that a non-zero potential is applied only to one surface, while the other five potential are identical zeroes. Thus, the first step, in some embodiments, is to break it up into six problems whose solution, when added together, gives the required complete solution. Each of these partial problems is identical with the original problem except that the potential are given as above, arbitrarily in one face of the solid only, while on the other five faces the potential is required to assume the value zero. In some embodiments, the faces in FIGS. 1A-1B are denoted by the system of equations below:

$S_1, S_2, S_3, S_4, S_4, S_6$.

$$S_1: U(\rho_1, z, \varphi) = U_1 = 1, U_2 = U_3 = U_4 = U_5 = U_6 = 0 \tag{1}$$

$$S_2: U(\rho_2, z, \varphi) = U_2 = 1, U_1 = U_3 = U_4 = U_5 = U_6 = 0 \tag{2}$$

$$S_3: U(\rho, z_1, \varphi) = U_3 = 1, U_1 = U_2 = U_4 = U_5 = U_6 = 0 \tag{3}$$

$$S_4: U(\rho, z_2, \varphi) = U_4 = 1, U_1 = U_2 = U_3 = U_5 = U_6 = 0 \tag{4}$$

$$S_5: U(\rho, z, \varphi_1) = U_5 = 1, U_1 = U_2 = U_3 = U_4 = U_6 = 0 \tag{5}$$

$$S_6: U(\rho, z, \varphi_2) = U_6 = 1, U_1 = U_2 = U_3 = U_4 = U_5 = 0 \tag{6}$$

In some embodiments, these six partial problems arrange themselves into three groups of two problems each. In the first of these groups, the exceptional face is one of the two cylindrical faces of inner cylindrical electrode 11 (on the exterior face of the inner cylinder) or outer cylindrical electrode 12 (on the interior face of the outer cylinder) ($\rho$=const). In the second group, it is one of the two parallel faces of first end electrode 15 (on a first end face of the CDA) or second end electrode 16 (on a second end face of the CDA) (also referred to as ends z=const). In the third group it is one of the two plane faces of first azimuthal electrode 13 (on a face of the first azimuthal plane) or second azimuthal electrode 14 (on a face of the second azimuthal plane) ($\varphi$=const). These three groups are shown in FIGS. 1A-1B. In some embodiments, these three types of problems have corresponding three different types of solution. The first two problems of any one group have solutions of the same form, which differ in the constants, etc., involved. In some embodiments, the first step toward the solution of any of these six partial problems is the same.

In some embodiments, the Dirichlet's problem is used in solving the solutions. The Dirichlet's problem is named after Lejeune Dirichlet, who prepared a solution by a variational method that became known as the Dirichlet principle. The existence of a unique solution is very plausible by the physical argument: any charge distribution on the boundary should, by the laws of electrostatics, determine an electrical potential as solution. The Dirichlet problem for Laplace's equation consists in finding a solution $\xi$ on some domain S such that $\xi$ on the boundary of S is equal to some given function. Since the Laplace operator appears in the heat equation, one physical interpretation of this problem is as follows: fix the temperature on the boundary of the domain and wait until the temperature in the interior does not change anymore; the temperature distribution in the interior will then be given by the solution to the corresponding Dirichlet problem. The Neumann boundary conditions for Laplace's equation specify not the function $\xi$ itself on the boundary of S, but its normal derivative. Physically, this corresponds to the construction of a potential for a vector field whose effect is known at the boundary of S alone. Solutions of Laplace's equation are called harmonic functions; they are all analytic within the domain where the equation is satisfied. If any two functions are solutions to Laplace's equation (or any linear homogenous differential equation), their sum (or any linear combination) is also a solution. This property, called the principle of superposition, is useful in some embodiments of the present technology, because solutions to the complex problem are constructed by summing simplified solutions.

In some embodiments, corresponding to the three predefined potential are three different types of solution, while the two problems of any one group have solutions of the same form that differ only in constants, etc. In some embodiments, defining the electric potential in the region shown in FIG. 1B requires the following boundary conditions on the potential U of the six electrodes:

$$a) \begin{cases} U(R, \varphi, z) = U(\rho, \varphi, 0) = U(\rho, \varphi, L) = U(\rho, \varphi_1, z) = U(\rho, \varphi_2, z), \\ U(\rho_1, \varphi, z) = U_0, \\ U(\rho_1, \varphi, z) = U(\rho, \varphi, 0) = U(\rho, \varphi, L) = U(\rho, \varphi_1, z) = U(\rho, \varphi_2, z), \\ U(R, \varphi, z) = U_1. \end{cases}$$

-continued $$b) \begin{cases} U(R, \varphi, z) = U(\rho_1, \varphi, z) = U(\rho, \varphi, L) = U(\rho, \varphi_1, z) = U(\rho, \varphi_2, z), \\ U(\rho, \varphi, z) = U_2, \\ U(R, \varphi, z) = U(\rho, \varphi, 0) = U(\rho_1, \varphi, z) = U(\rho, \varphi_1, z) = U(\rho, \varphi_2, z), \\ U(\rho, \varphi, L) = U_3. \end{cases}$$

$$c) \begin{cases} U(R, \varphi, z) = U(\rho, \varphi, 0) = U(\rho, \varphi, L) = U(\rho_1, \varphi, z) = U(\rho, \varphi_2, z), \\ U(\rho, \varphi_1, z) = U_4, \\ U(R, \varphi, z) = U(\rho, \varphi, 0) = U(\rho, \varphi, L) = U(\rho_1, \varphi, z) = U(\rho_1, \varphi, z), \\ U(\rho, \varphi_2, z) = U_5. \end{cases}$$

Writing Laplace's equation in cylindrical coordinates:

$$\nabla^2 U = 0 \Rightarrow \frac{1}{\rho}\frac{\partial}{\partial \rho}\left(\rho \frac{\partial U}{\partial \rho}\right) + \frac{1}{\rho^2}\frac{\partial^2 U}{\partial \varphi^2} + \frac{\partial^{21} U}{\partial z^2} = 0 \quad (7)$$

In some embodiments, expressing the potential as a product of three potential functions:

$$U(\rho,\varphi,z) = R(\rho)Z(z)\Phi(\varphi) \quad (8)$$

Substituting equation (8) into (7) and dividing by $RZ\Phi$ yields:

$$\frac{1}{R\rho}\frac{d}{d\rho}\left(\rho \frac{dR}{d\rho}\right) + \frac{1}{\rho^2}\frac{1}{\Phi}\frac{d^2\Phi}{d\varphi^2} + \frac{1}{Z}\frac{d^2Z}{dz^2} = 0 \quad (9)$$

Transferring function dependent on z on one hand side of the equation yields:

$$\frac{1}{R\rho}\frac{d}{d\rho}\left(\rho \frac{dR}{d\rho}\right) + \frac{1}{\rho^2}\frac{1}{\Phi}\frac{d^2\Phi}{d\varphi^2} = -\frac{1}{\Psi}\frac{d^2\Psi}{dz^2} = \pm \lambda^2 \quad (10)$$

In some embodiments, this gives an equation that purely depends on function Z(z):

$$\frac{d^2 Z(z)}{dZ^2} \pm \lambda^2 Z(z) = 0 \quad (11)$$

Depending on the sign of $\lambda^2$, the equation has two possible solutions:

$$Z(z) = d \sin(\lambda z) + e \cos(\lambda z), \text{ for } +\lambda^2, \quad (12)$$

$$Z(z) = d \sinh(\lambda z) + e \cosh(\lambda z), \text{ for } -\lambda^2. \quad (13)$$

The potential of a flat uniform dipole layer is equal to the solid angle at which this layer is seen from the point r, taken with positive sign if the positively charged side of the layer is seen from r, and with negative sign otherwise. Thus, some embodiments refer to the quantity Z(z) as a solid angle subtended by one of the faces from the point r. In some embodiments, the complexity of the potential charges as $\lambda$ takes on values on the complex plane. Returning to the left hand side ("LHS") of equation (10), multiplying it by $\rho^2$ and separating the variables yields:

$$\frac{\rho^2}{R}\frac{d^2R}{d\rho^2} + \frac{\rho}{R}\frac{dR}{d\rho} + \frac{1}{\Phi}\frac{d^2\Phi}{d\varphi^2} = \pm \lambda^2 \rho^2 \quad (14)$$

$$\frac{\rho}{R}\frac{d}{d\rho}\left(\rho \frac{dR}{d\rho}\right) \pm \lambda^2 \rho^2 = -\frac{1}{\Phi}\frac{d^2\Phi}{d\varphi^2} = +\xi^2$$

The chosen value of the second space variable returns a function that is uniquely dependent on $\varphi$. In some embodiments, this is useful in solving the problem with non-uniform boundary condition on the planes and cylindrical planes. A negative sign before $\xi^2$ is used in problems with non-uniform conditions on the boundary $\varphi$=const, which arises here in some embodiments. Thus, some embodiments have two other equations for $\Phi$ and R:

$$\frac{d^2\Phi}{d\varphi^2} + \xi^2 \Phi = 0 \quad (15)$$

Equation (15) has solutions:

$$\Phi(\varphi) = D_1 \sin(\xi\varphi) + D_2 \cos(\xi\varphi) \quad (16)$$

$$\frac{\rho}{R}\frac{d}{d\rho}\left(\rho \frac{dR}{d\rho}\right) + \left(\pm \lambda^2 - \xi^2\right) = 0 \quad (17)$$

Some embodiments consider the field inside a complete cylinder ($0 \leq \varphi \leq 2\pi$), then the potential is a periodic function of the space coordinates $\varphi$ with a period of $2\pi$:

$$\Phi(\varphi) = \Phi(\varphi + 2\pi) \quad (18)$$

Then $\xi = n$—natural numbers, and $$\Phi_n(\varphi) = D_1 \sin(n\varphi) + D_2 \cos(n\varphi) \quad (19)$$

$$\rho^2 \frac{d^2R}{d\rho^2} + \rho \frac{dR}{d\rho} + \left(\pm \lambda^2 \rho^2 - n^2\right)R = 0 \quad (20)$$

Equation (20) represents the Bessel equation of order n and argument $\lambda$. In some embodiments, a system of equations is built with solution written as $$\frac{d^2Z}{dz^2} = \pm \lambda^2 Z(z) \quad (21)$$

$$\frac{d^2R(\rho)}{d\rho} + \frac{1}{\rho}\frac{dR(\rho)}{d\rho} - \left[\lambda^2 - \frac{n^2}{\rho^2}\right]R(\rho) = 0 \quad (22)$$

$$\frac{d^2\Phi(\varphi)}{d\varphi^2} = n^2 \Phi(\varphi) \quad (23)$$

In some embodiments, the general solution of this system is written as:

$$Z(z) = A_1 \exp(\lambda z) + B_1 \exp(-\lambda z),$$

$$R(\rho) = A_2 J_n(\lambda \rho) + B_2 Y_n(\lambda \rho)$$

$$\Phi(\varphi) = A_3 \cos(n\varphi) + B_3 \sin(n\varphi) \quad (25)$$

Some embodiments define these equipotential boundaries or displacement potential surfaces as: $z=z_0$, $z=0$ and on the cylindrical surfaces $r=r_1$ and $r=r_2$ by $S_1$: $u=u_1$, $S_2$: $u=u_2$, $S_3$: $u=u_3$, $S_4$: $u=u_4$.

In some embodiments, the method of separation of variables is used to obtain analytical expressions for the displacement potential problem. Using the Fourier's method, the solutions are expressed as the product $R(r)\Psi(z)\Phi(\theta)$. In some embodiments, the general solution is expressed using equation (25) as:

$$u(r,\theta,z)=\Psi(z)\Phi(\theta)[A_2 J_n(\lambda r)+B_2 Y_n(\lambda r)] \quad (26)$$

$\Psi(z)=A_1 e^{\lambda z}+B_1 e^{-\lambda z}$, $\Phi(\theta)=A_3 \sin(n\theta)+B_3 \cos(n\theta)$ and are partial solutions with $J_n(\lambda r)$ and $Y_n(\lambda r)$ denoting Bessel functions of the first kind and the Neumann functions, respectively. With $A_m$, $B_m$, $m \in \{1, 2, 3\}$ being integral coefficients, n and $\lambda$ differential parameters. In some embodiments, these unknown quantities are obtained by using the boundary conditions discussed above.

Closed Compact Analytical Solution

In some embodiments, the choice of cylindrical coordinates permits the possibility of expressing the potential boundary surfaces of the system as concentric cylinders with six exceptional faces: two radial faces corresponding to the radii of the internal and external cylinders, two azimuthal faces, and two planes. A six partial boundary problem corresponding to the six faces based on equations (1)-(6) is represented below:

$S_1: u(r_1,z,\theta)=u_1; u_2=u_3=u_4=u_5=u_6=0$, $S_2: u(r_2,z,\theta)=u_2; u_1=u_3=u_4=u_5=u_6=0$, $S_3: u(r,z_1,\theta)=u_3; u_1=u_2=u_4=u_5=u_6=0$, $S_4: u(r,z_2,\theta)=u_4; u_1=u_2=u_3=u_5=u_6=0$, $S_5: u(r,z,\theta_1)=u_5; u_1=u_2=u_3=u_4=u_6=0$, $S_6: u(r,z,\theta_2)=u_6; u_1=u_2=u_3=u_4=u_5=0$.

In some embodiments, equation (26) is referred to as the Lame's product, which is used to build a series expression for the cases of zero potential on the surfaces of $S_2$ and $S_4$, while the others assume an arbitrary value that can be introduced with respect to the specific construction of the wire system. In embodiments having infinite wire in length, the faces $\theta$=const. For the Lame's product to vanish on the boundaries $\theta=0$ and $z=0$, the coefficient $B_3=0$. This reduces the solution to:

$$u(r,\theta,z)=2A_1 A_3 \sinh(\lambda z)\sin(n\theta)[A_2 J_n(\lambda r)+B_2 Y_n(\lambda r)]$$

For the Lame's product to take on $$\theta = \varphi_0, n = \frac{v\pi}{\varphi_0}$$

where v is a natural number. Equation (26) vanishes when $r=r_1$, yielding:

$$\frac{A_2}{B_2} = -\frac{Y_{\frac{v\pi}{\varphi_0}}(\lambda r_1)}{J_{\frac{v\pi}{\varphi_0}}(\lambda r_1)} \quad (27)$$

$$u(r,\theta,z) = D_{v\lambda\theta}\sinh(\lambda z)\sin\left(\frac{v\pi}{\varphi_0}\theta\right)\left[J_{\frac{v\pi}{\varphi_0}}(\lambda r) - \frac{J_{\frac{v\pi}{\varphi_0}}(\lambda r_1)}{Y_{\frac{v\pi}{\varphi_0}}(\lambda r_1)}Y_{\frac{v\pi}{\varphi_0}}(\lambda r)\right]$$

In some embodiments, equation (27) is vanity on the surface $r=r_1$, and this provides a measure for obtaining the Lame's constant $\lambda$ as a solution to the transcendental equation:

$$J_{\frac{v\pi}{\varphi_0}}(\lambda r_2) Y_{\frac{v\pi}{\varphi_0}}(\lambda r_1) - Y_{\frac{v\pi}{\varphi_0}}(\lambda r_2) J_{\frac{v\pi}{\varphi_0}}(\lambda r_1) = 0 \quad (28)$$

In some embodiments, equation (28) has a finite number of real roots that are multiples of $\pi$. These roots can be re-arranged in order of increasing magnitude $\lambda_1, \lambda_2, \ldots \lambda_k \ldots$. A closed form analytical solution expressed in the form of equation (27), which converges, has been obtained in some embodiments. The only remaining unknown, the parameter $D_{kv}$ is found in some embodiments by imposing the only remaining boundary condition for non-vanishing Lame's product on the surface $z=Z_0$. In some embodiments, this requires implementing a piecewise Fourier integral transformation:

$$u_a(r,\theta) = \quad (29)$$

$$\sum_{k=1}^{\infty}\sum_{v=1}^{\infty} a_{1,kv} \sin\left(\frac{v\pi}{\varphi_0}\theta\right)\left[J_{\frac{v\pi}{\varphi_0}}(\lambda_k r) + b_{1,kv} Y_{\frac{v\pi}{\varphi_0}}(\lambda_k r)\right]$$

In embodiments where the non-vanishing surface is that of $z=0$, a similar expression is obtained if the exceptional faces are $r_1, r_2$:

$$u_b(z,\theta) = \quad (30)$$

$$\sum_{k=1}^{\infty}\sum_{v=1}^{\infty} a_{2,kv} \sin(\lambda_k Z)\left[J_{\frac{v\pi}{\varphi_0}}(i\lambda_k r) + b_{2,kv} Y_{\frac{v\pi}{\varphi_0}}(i\lambda_k r)\right]$$

In embodiments where the exceptional faces are $\theta_0, \theta_1$, the solution takes the form:

$$u_c(r,z) = \quad (31)$$

$$\sum_{k=1}^{\infty}\sum_{v=1}^{\infty} a_{3,kv} \sinh(\lambda_k Z)\left[I_{i\frac{v\pi}{\varphi_0}}(i\lambda_k r) + b_{3,kv} Y_{i\frac{v\pi}{\varphi_0}}(i\lambda_k r)\right]$$

With $a_{i,kv}$ and $b_{i,kv}$ being associated series coefficients, respectively, for i=1, 2, 3. In some embodiments of the analytical methodology disclosed herein, if the Cartesian coordinate axis system defines the $X_3$ axis in the direction of periodicity of wire, then the $X_2$ axis is normal to the wire in the cross-sectional plane, and the $X_1$ axis is along the wires. In some embodiments, the cylindrical coordinate system and axis transformations permits obtaining the general solution of the displacement:

$$u=u_a+u_b+u_c \quad (32)$$

With the assumption of infinity long cylinder in the $X_1$ direction (which corresponds to axial symmetric problem in cylindrical coordinate system). In some embodiments, this corresponds to selecting the plane $\varphi_0$=const, and in some embodiments, this constant is $\pi$ for a vanishing $\theta$. With these conditions, a solution is given:

$$u(r,z) = \sum_{k=1}^{\infty}\sum_{n=1}^{\infty} a_{kv} \sin(\lambda_k z)[Cd_n(\lambda_k r) + b_{kn}Sd_n(\lambda_k r)] \quad (33)$$

Where $Cd_n(x)$, $Sd_n(x)$ defines the modified Bessel functions of pure imaginary indices. In some embodiments, algorithms for their computations first introduced in and it was shown that they converge after a few iterations.

EXAMPLES

In some embodiments, the electric field for a specific radial (see FIG. 2) plane $r_\parallel = \text{const}$ is written as polynomial $$C(\bar{z}) = A(i\bar{z}) = \sum_{n=0}^{\infty} C_{2n}\left(\frac{\bar{z}}{2}\right)^{2n}$$

where $\bar{z} = 1/z$. In some embodiments, this function is expressed as a combination of the real and imaginary part of the complex Bessel function or pure imaginary indices: $J_{iv}(ix) = Cd_v + iSd_v(x)$. In some embodiments, an error metric $\varepsilon_N$, of $$\varepsilon_N \leq \frac{24}{(N!)^2}$$

depending on the number of terms of the series is obtained. For example, taking the field $u_z(r,z)$ with the chosen arbitrary plane $r_\parallel = \text{const}$, the equipotential displacement surface corresponding to $u_z(r_\parallel, z_0) = \text{const}$ can be read out.

In some embodiment, by taking the Taylor's expansion of the electric potential about this point yields $$z_N - z_{N-1} = -\frac{\Delta_r U_z}{\Delta_z U_z}(r_N - r_{N-1}).$$

Some embodiments define the spatial resolution in the q-direction as $\Delta x_q$, where q is collinear with the coordinate axis of r or z, for example:

$$\frac{z_N - z_{N-1}}{r_N - r_{N-1}} = \frac{\Delta x_z}{\Delta x_r} = -\frac{\Delta_r u_z}{\Delta_z u_z} > 0 \quad (34)$$

For the above ratio to be negative, the signs of the displacement field gradients $\Delta_r u_z$, $\Delta_z u_z$ have to be defined:

$$\max_{\square}\left(\frac{\partial u_{r,z}}{\partial q}\right) - \min_{\square}\left(\frac{\partial u_{r,z}}{\partial q}\right) = \Delta_q u_{r,z}^{max} \quad (35)$$

Figure 3:
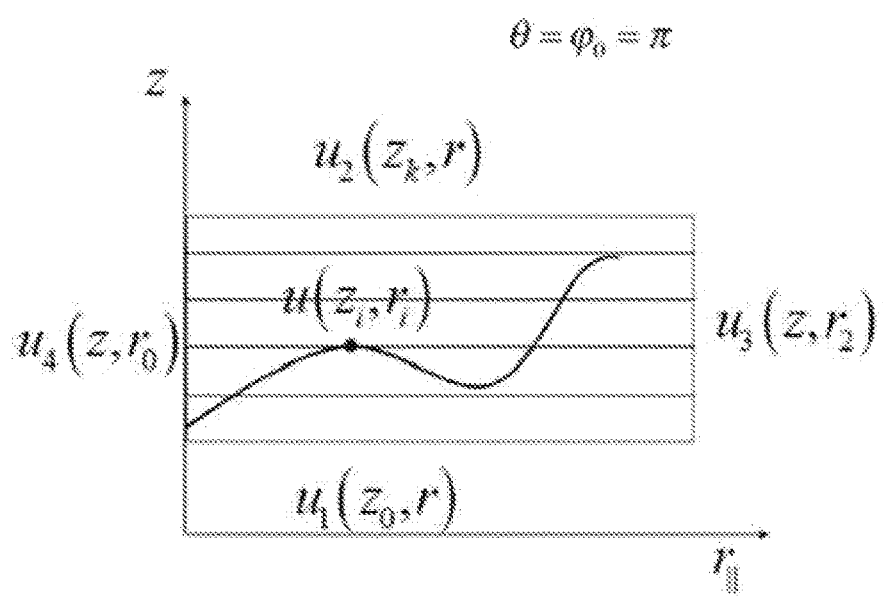
FIG. 3 is a chart showing an exemplary constant azimuthal angle $\theta = \varphi_0 = \pi$ used to compute the electrostatic potential distribution for a four-electrode system.
Figure 4A:
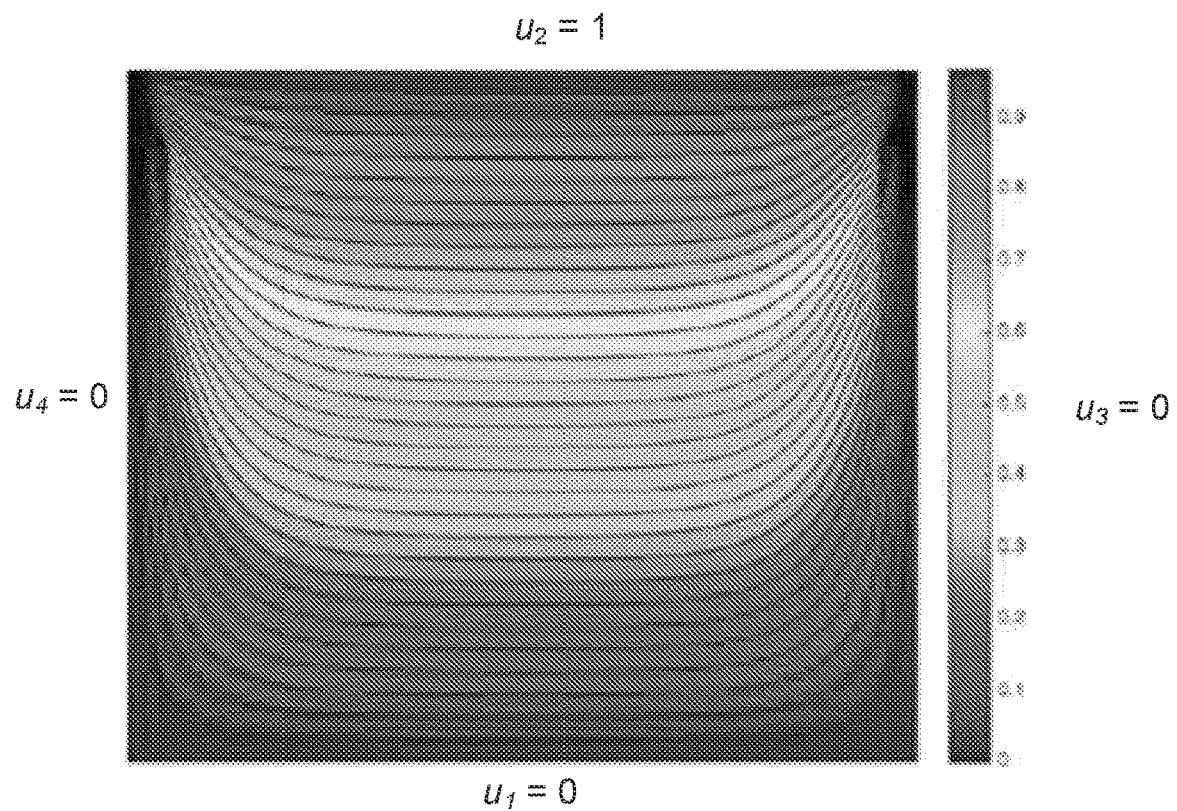
FIG. 4A-4D show an exemplary 2D distribution of electrostatic potential in the CDA with a constant azimuthal angle $\theta = \varphi_0 = \pi$ used to compute the electrostatic potential distribution from the analytical expression in equation (32) with boundary conditions as labeled in the figures.
Figure 4B:
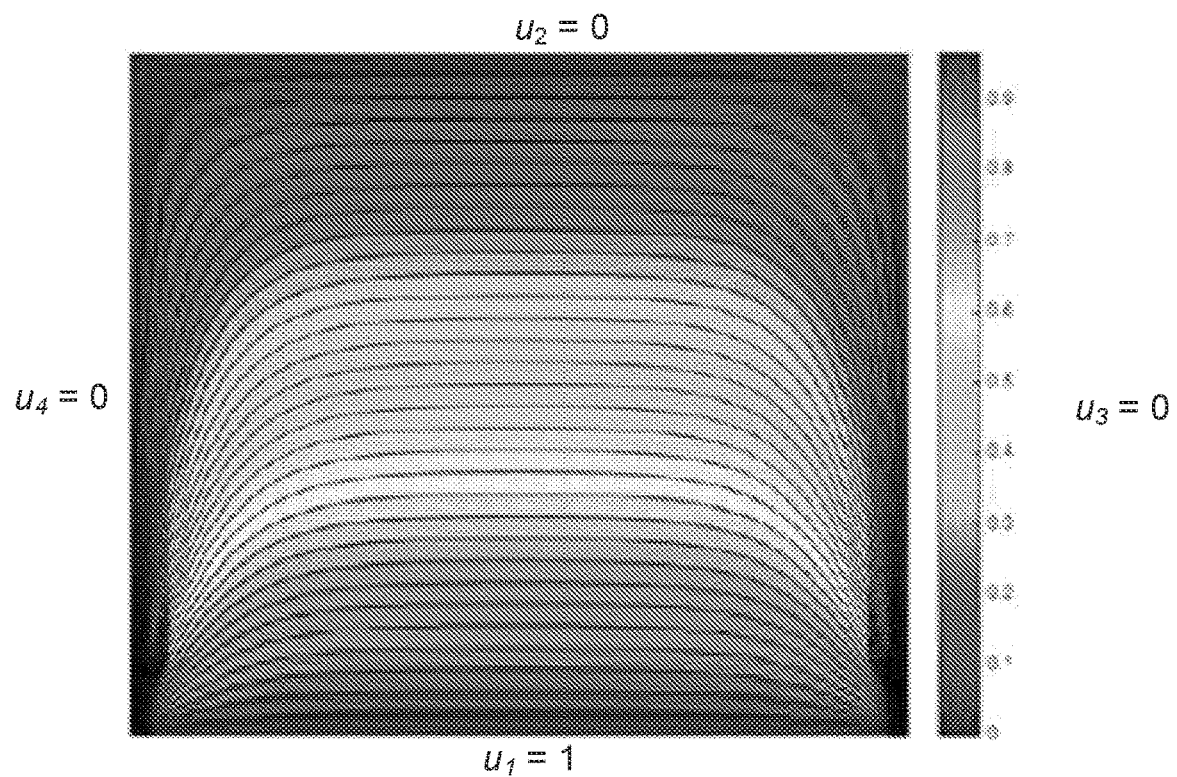
Figure 4C:
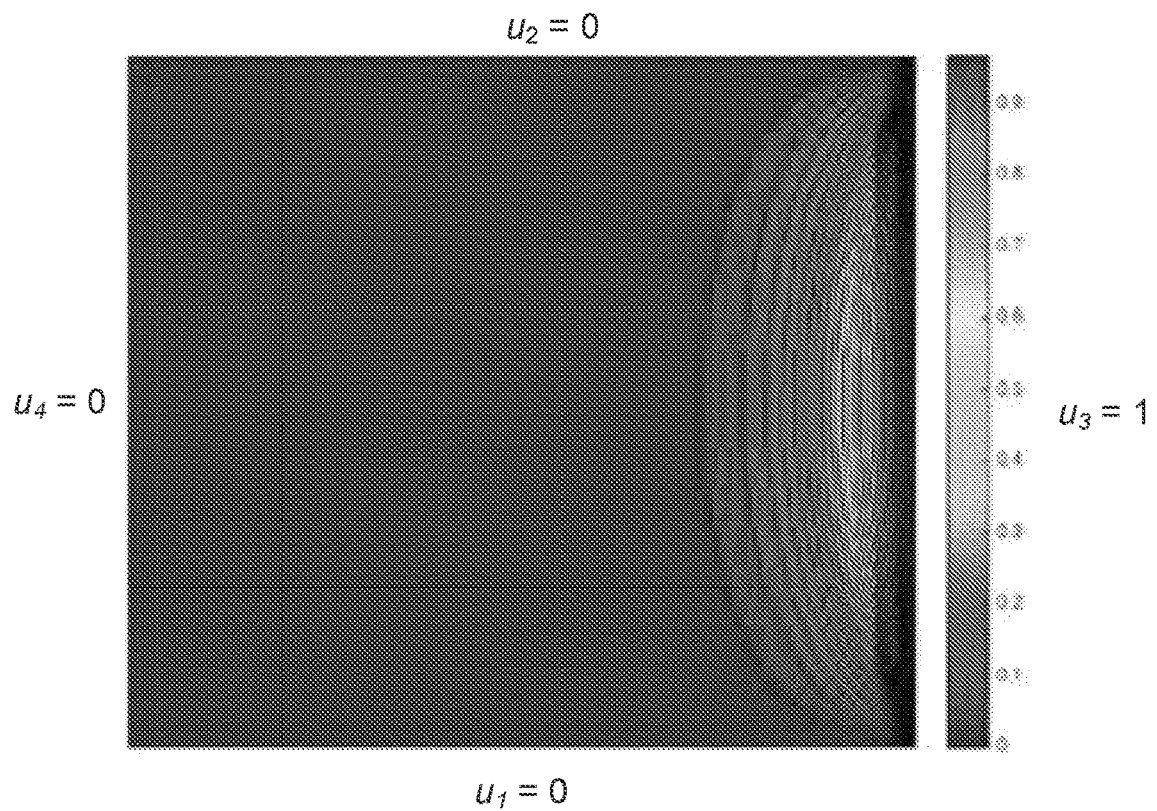
Figure 4D:
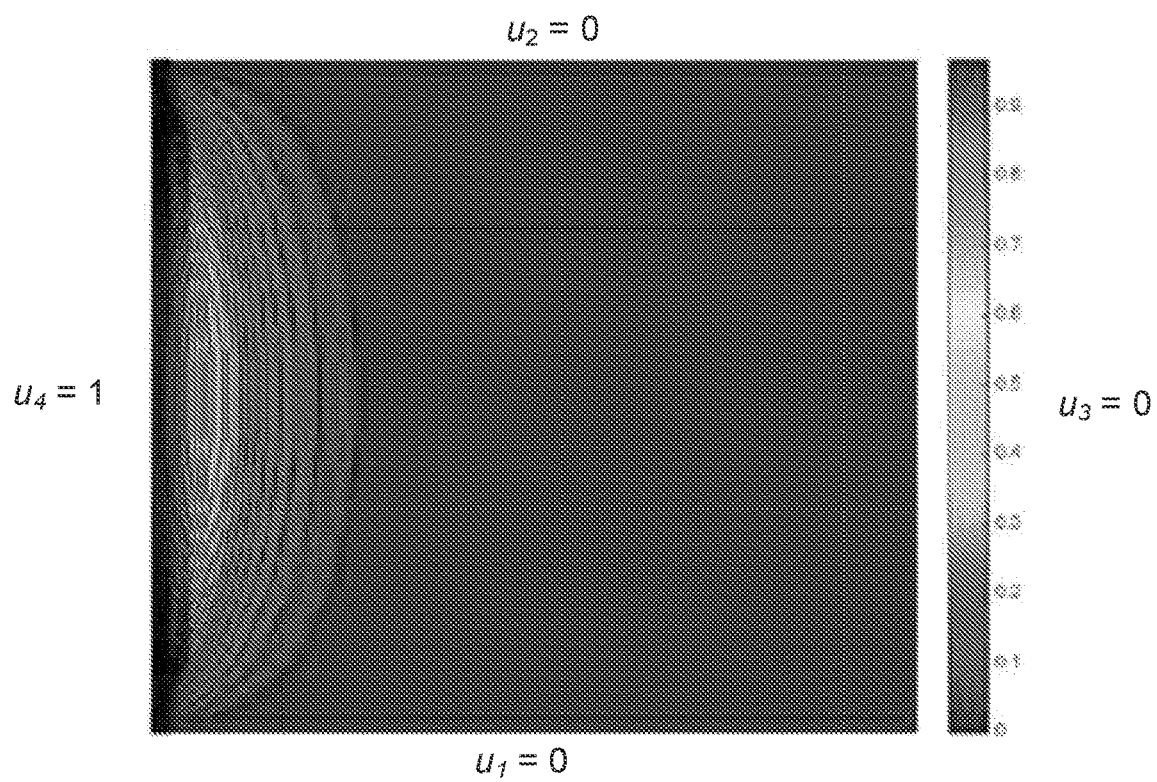
Figure 5A:
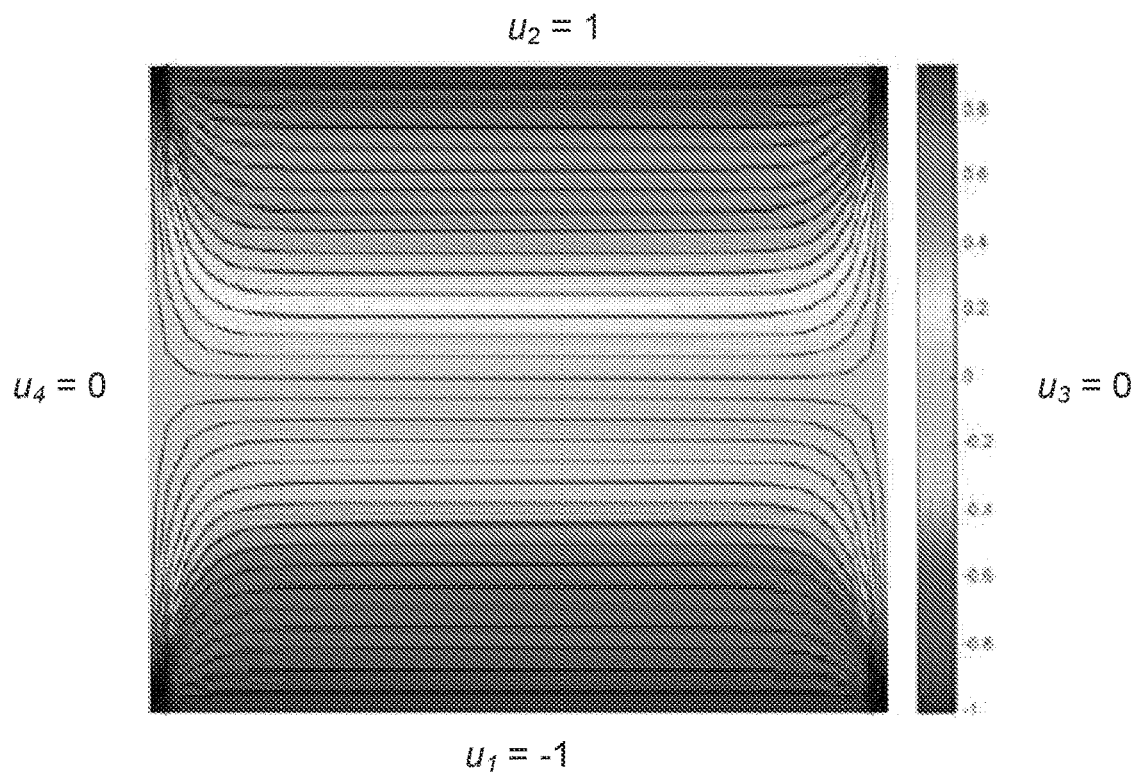
FIG. 5A-5D show an exemplary 2D distribution of electrostatic potential in the CDA with a constant azimuthal angle $\theta = \varphi_0 = \pi$ used to compute the electrostatic potential distribution from the analytical expression in equation (32) with boundary conditions as labeled in the figures.
Figure 5B:
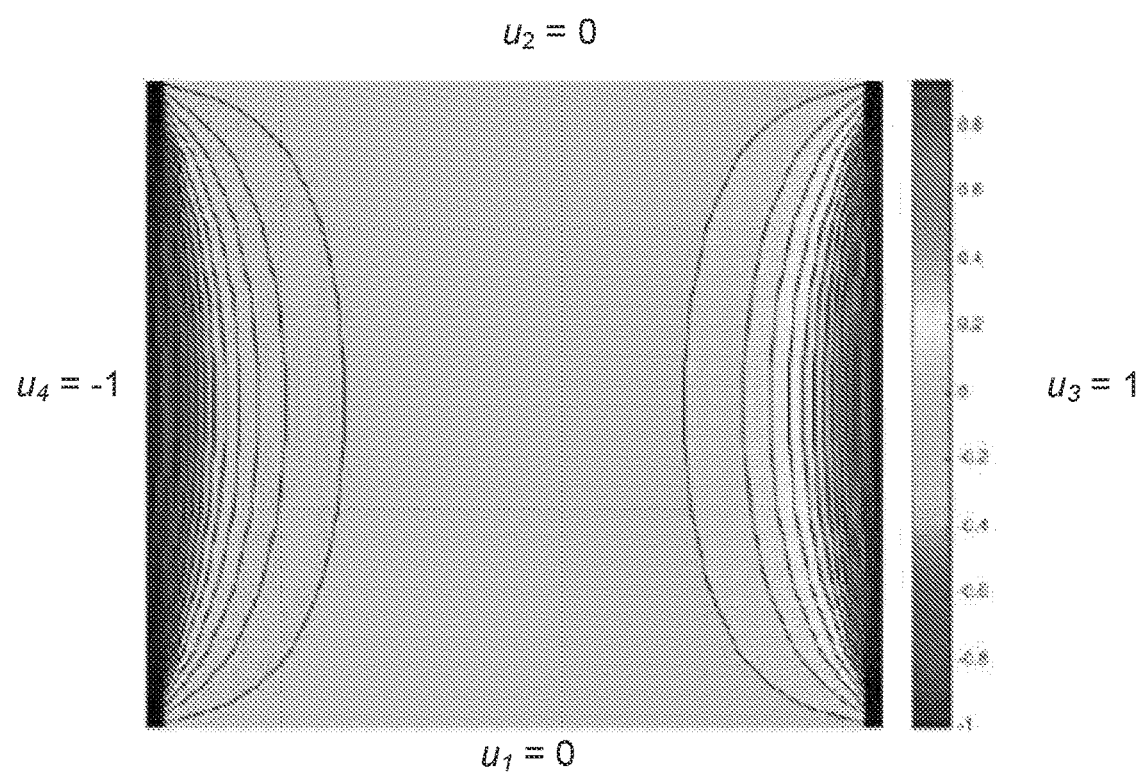
Figure 5C:
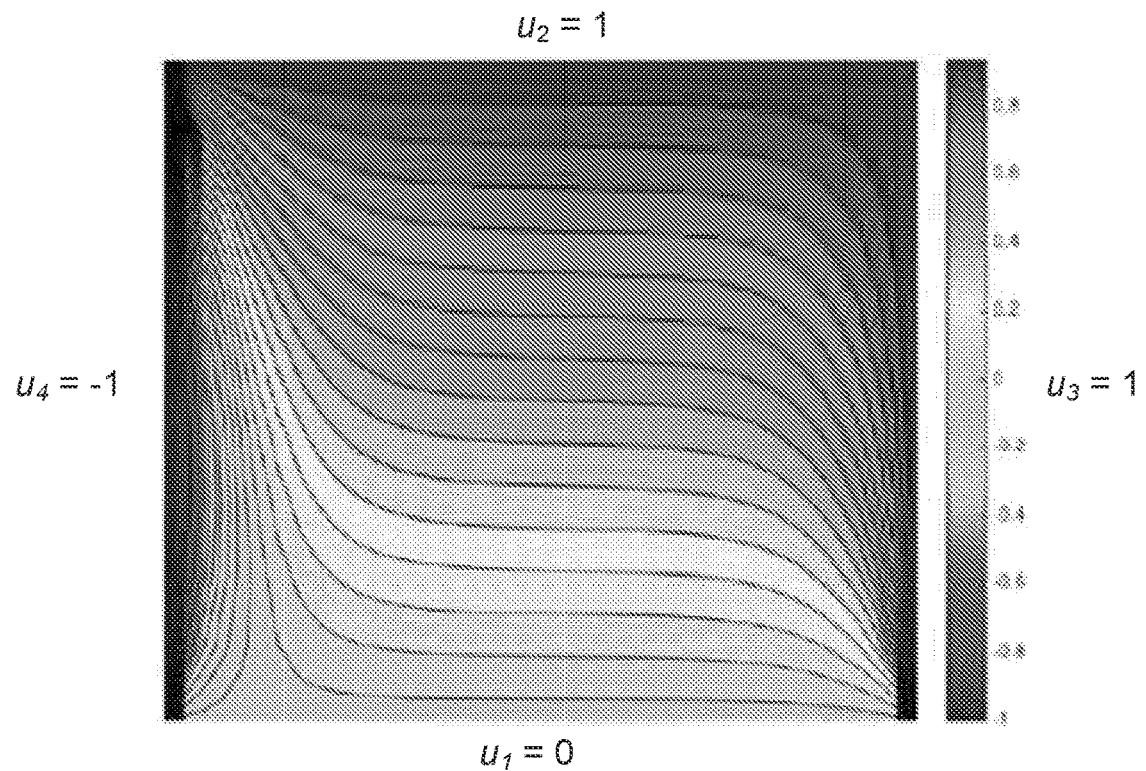
Figure 5D:
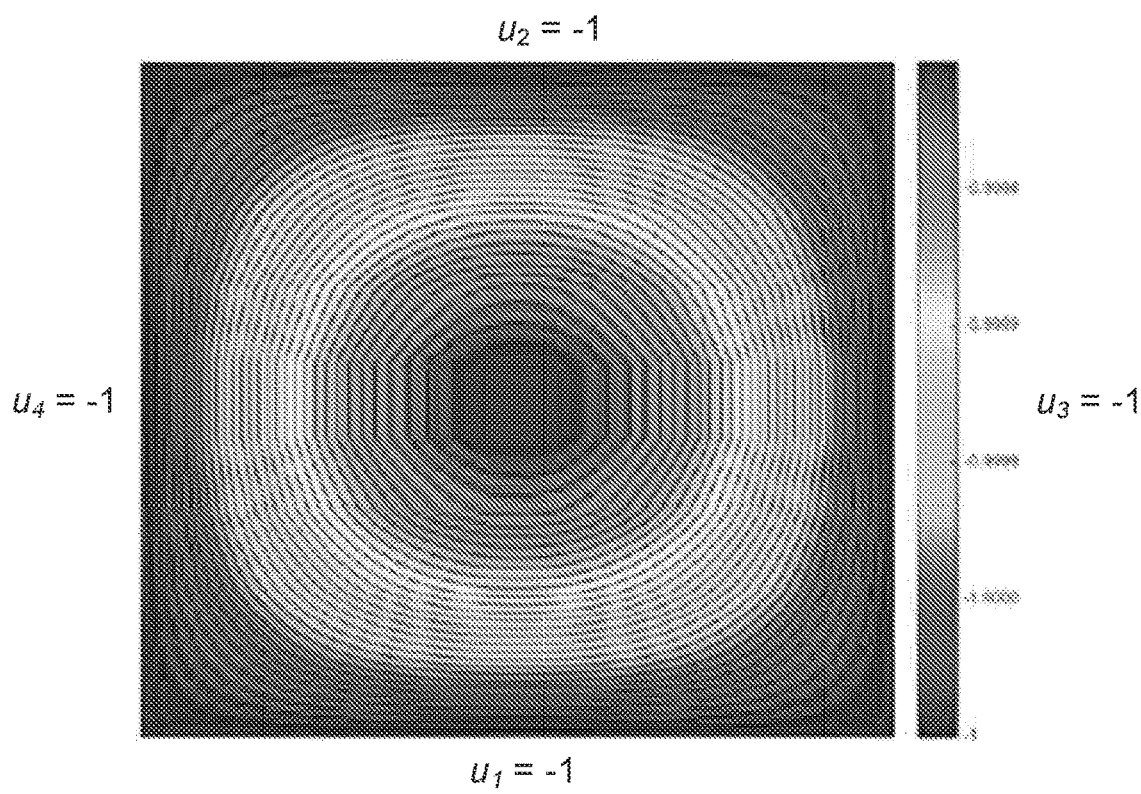

Equation (32) describes a closed and compact analytical expression that can be used to compute the 2D electrostatic potential distribution in a six electrode CDA. In some embodiments, this equation is used to describe a generalized concept of a CDA with arbitrary azimuthal angle $\theta = \varphi_0$, as shown in FIG. 2. In some embodiments, the deflecting angles are smaller than 127.3° and the source and image plane are located outside of the analyzer in the field-free space. In some embodiments, with a beam particle entering at a radius $r_0$, the potential (voltages) across four electrodes shown in FIG. 3 is set as a function of probe geometry at constant $\theta = \varphi_0 = \pi$. FIG. 4A-4D and FIGS. 5A-5D show various operational modes for the CDA by computing the 2D field distribution.

In some embodiments, the CDA is operated with equal and opposite voltages applied to the electrode plates. As shown in FIG. 5A-5D, when $u_1 = -u_2$, the electrical center of the CDA is located at $r_0 = \sqrt{r_1 r_2} = \sqrt{\rho_1 \rho_2}$. In this embodiment, the particle beam is designed to enter the CDA at this radius instead of at half the gap width. One major advantage of the present technology over the standard CDA is the possibility of focusing in more than one plane of deflection. In some embodiments, this is engineered by a choice of the potential boundary conditions and geometric parameters. In some embodiments, focusing in both x and y-directions occurring for special cases $\varphi = \pi$ deflections makes the device function as a hemispherical energy analyzer.

Although the technology has been described and illustrated with respect to exemplary embodiments thereof, it should be understood by those skilled in the art that the foregoing and various other changes, omissions, and additions may be made therein and thereto, without parting from the spirit and scope of the present technology.

What is claimed is:

1. An electrostatic analyzer comprising:
   a cylindrical body comprising an inner cylinder and an outer cylinder that are coaxial with one another along a longitudinal axis of the cylindrical body;
   an inner cylindrical electrode positioned on an exterior face of the inner cylinder;
   an outer cylindrical electrode positioned on an interior face of the outer cylinder;
   a first azimuthal electrode positioned on a face of a first azimuthal plane that passes through the longitudinal axis;
   a second azimuthal electrode positioned on a face of a second azimuthal plane that passes through the longitudinal axis;
   a first end electrode positioned on a first end face of the cylindrical body; and
   a second end electrode positioned on a second end face of the cylindrical body.

2. The electrostatic analyzer of claim 1, wherein the inner cylinder and the outer cylinder are spaced apart to form a gap therebetween, the gap having an entry slit positioned at a first end thereof and an exit slit positioned at a second end thereof.

3. The electrostatic analyzer of claim 2, further comprising a detector positioned adjacent the exit slit configured to receive a particle beam that enters the gap via the entry slit and exits the gap via the exit slit.

4. The electrostatic analyzer of claim 2, wherein the entry slit and the exit slit are positioned such that a particle beam is configured to enter the gap at a radius of the electrical center of the electrostatic analyzer.

5. The electrostatic analyzer of claim 4, wherein the inner cylindrical electrode and the outer cylindrical electrode have equal and opposite voltages applied thereto and the electrical center of the electrostatic analyzer is located at $r_0 = \sqrt{r_1 r_2}$, where $r_1$ is the radius of the inner cylindrical electrode and $r_2$ is the radius of the outer cylindrical electrode.

6. A method of determining the electrostatic field distribution in an electrostatic analyzer, comprising:
   providing an electrostatic analyzer comprising:
       a cylindrical body comprising an inner cylinder and an outer cylinder that are coaxial with one another along a longitudinal axis of the cylindrical body;
       an inner cylindrical electrode positioned on an exterior face of the inner cylinder;
       an outer cylindrical electrode positioned on an interior face of the outer cylinder;
       a first azimuthal electrode positioned on a face of a first azimuthal plane that passes through the longitudinal axis;

a second azimuthal electrode positioned on a face of a second azimuthal plane that passes through the longitudinal axis;
a first end electrode positioned on a first end face of the cylindrical body; and
a second end electrode positioned on a second end face of the cylindrical body;
grouping the boundary conditions of each of the electrodes into six simplified problems;
defining the electric potential in the electrostatic analyzer by applying the Dirichlet's problem to the six simplified problems;
expressing the electric potential as a product of three potential functions in terms of Laplace's equation for cylindrical coordinates;
transferring a function to another side of the equation and separating the variables;
using the Bessel equation to build a system of equations; and
determining a general solution to the system of equations.

7. The method of claim 6, wherein the six simplified problems comprises:

$$S_1 : U(\rho_1, z, \varphi) = U_1 = 1, U_2 = U_3 = U_4 = U_5 = U_6 = 0$$

$$S_2 : U(\rho_2, z, \varphi) = U_2 = 1, U_1 = U_3 = U_4 = U_5 = U_6 = 0$$

$$S_3 : U(\rho, z_1, \varphi) = U_3 = 1, U_1 = U_2 = U_4 = U_5 = U_6 = 0$$

$$S_4 : U(\rho, z_2, \varphi) = U_4 = 1, U_1 = U_2 = U_3 = U_5 = U_6 = 0$$

$$S_5 : U(\rho, z, \varphi_1) = U_5 = 1, U_1 = U_2 = U_3 = U_4 = U_6 = 0$$

$$S_6 : U(\rho, z, \varphi_2) = U_6 = 1, U_1 = U_2 = U_3 = U_4 = U_5 = 0.$$

8. The method of claim 6, wherein the electric potential defined by the Dirichlet's problem comprises:

$$a) \begin{cases} U(R, \varphi, z) = U(\rho, \varphi, 0) = U(\rho, \varphi, L) = U(\rho, \varphi_1, z) = U(\rho, \varphi_2, z), \\ U(\rho_1, \varphi, z) = U_0, \\ U(\rho_1, \varphi, z) = U(\rho, \varphi, 0) = U(\rho, \varphi, L) = U(\rho, \varphi_1, z) = U(\rho, \varphi_2, z), \\ U(R, \varphi, z) = U_1. \end{cases}$$

$$b) \begin{cases} U(R, \varphi, z) = U(\rho_1, \varphi, z) = U(\rho, \varphi, L) = U(\rho, \varphi_1, z) = U(\rho, \varphi_2, z), \\ U(\rho, \varphi, 0) = U_2, \\ U(R, \varphi, z) = U(\rho, \varphi, 0) = U(\rho_1, \varphi, z) = U(\rho, \varphi_1, z) = U(\rho, \varphi_2, z), \\ U(\rho, \varphi, L) = U_3. \end{cases}$$

$$c) \begin{cases} U(R, \varphi, z) = U(\rho, \varphi, 0) = U(\rho, \varphi, L) = U(\rho_1, \varphi, z) = U(\rho, \varphi_2, z), \\ U(\rho, \varphi_1, z) = U_4, \\ U(R, \varphi, z) = U(\rho, \varphi, 0) = U(\rho, \varphi, L) = U(\rho, \varphi_1, z) = U(\rho_1, \varphi, z), \\ U(\rho, \varphi_2, z) = U_5. \end{cases}$$

9. The method of claim 6, wherein the three potential functions in terms of Laplace's equation for cylindrical coordinates comprises:

$$\frac{1}{R\rho}\frac{d}{d\rho}\left(\rho\frac{dR}{d\rho}\right) + \frac{1}{\rho^2}\frac{1}{\Phi}\frac{d^2\Phi}{d\varphi^2} + \frac{1}{Z}\frac{d^2Z}{dz^2} = 0.$$

10. The method of claim 6, wherein the equation after the transferring step comprises:

$$\frac{\rho^2}{R}\frac{d^2R}{d\rho^2} + \frac{\rho}{R}\frac{dR}{d\rho} + \frac{1}{\Phi}\frac{d^2\Phi}{d\varphi^2} = \pm\lambda^2\rho^2$$

$$\frac{\rho}{R}\frac{d}{d\rho}\left(\rho\frac{dR}{d\rho}\right) \pm \lambda^2\rho^2 = -\frac{1}{\Phi}\frac{d^2\Phi}{d\varphi^2} = +\xi^2.$$

11. The method of claim 6, wherein the system of equations comprises:

$$\frac{d^2Z(z)}{dz^2} = \pm\lambda^2 Z(z),$$

$$\frac{d^2R(\rho)}{d\rho^2} + \frac{1}{\rho}\frac{dR(\rho)}{d\rho} - \left[\lambda^2 - \frac{n^2}{\rho^2}\right]R(\rho) = 0,$$

$$\frac{d^2\Phi(\varphi)}{d\varphi^2} = n^2\Phi(\varphi).$$

12. The method of claim 6, wherein the general solution to the system of equations comprises:

$$Z(z) = A_1 \exp(\lambda z) + B_1 \exp(-\lambda z),$$

$$R(\rho) = A_2 J_n(\lambda\rho) + B_2 Y_n(\lambda\rho)$$

$$\Phi(\varphi) = A_3 \cos(n\varphi) + B_3 \sin(n\varphi).$$

13. An electrostatic analyzing system comprising:
an electrostatic analyzer comprising:
a cylindrical body comprising an inner cylinder and an outer cylinder that are coaxial with one another along a longitudinal axis of the cylindrical body, the inner cylinder and the outer cylinder are spaced apart to form a gap therebetween;
an entry slit positioned at a first end of the gap;
an exit slit positioned at a second end of the gap;
a first azimuthal electrode positioned on a face of a first azimuthal plane that passes through the longitudinal axis;
a second azimuthal electrode positioned on a face of a second azimuthal plane that passes through the longitudinal axis;
a first end electrode positioned on a first end face of the cylindrical body; and
a second end electrode positioned on a second end face of the cylindrical body;
wherein the gap is configured such that a particle beam can enter the gap via the entry slit and exit the gap via the exit slit; and
a detector positioned adjacent the exit slit and configured to receive the particle beam.

14. The system of claim 13, further comprising:
an inner cylindrical electrode positioned on an exterior face of the inner cylinder; and
an outer cylindrical electrode positioned on an interior face of the outer cylinder.

15. The system of claim 14, wherein the inner cylindrical electrode and the outer cylindrical electrode have equal and opposite voltages applied thereto.

16. The system of claim 14, wherein a radius of the electrical center of the electrostatic analyzer is located at $r_0 = \sqrt{r_1 r_2}$, where $r_1$ is the radius of the inner cylindrical electrode and $r_2$ is the radius of the outer cylindrical electrode.

17. The system of claim 16, wherein the entry slit is positioned such that the particle beam is configured to enter the gap at the radius of the electrical center of the electrostatic analyzer.

18. The system of claim 16, wherein the exit slit is positioned such that the particle beam is configured to exit the gap at the radius of the electrical center of the electrostatic analyzer.

* * * * *